United States Patent
Gurusamy et al.

(10) Patent No.: US 12,367,208 B2
(45) Date of Patent: Jul. 22, 2025

(54) NO-CODE METHOD FOR INTEGRATING COMPLEX DATA TOPOLOGIES

(71) Applicant: Boomi, LP, Conshohocken, PA (US)

(72) Inventors: Sampathkumar Gurusamy, Linwood, WA (US); Dana Burkart, San Jose, CA (US); Alejandro Flores, Mongaup Valley, NY (US); Steve Lucas, Conshohocken, PA (US)

(73) Assignee: BOOMI, LP, Conshohocken, PA (US)

( * ) Notice: Subject to any disclaimer, the term of this patent is extended or adjusted under 35 U.S.C. 154(b) by 105 days.

(21) Appl. No.: 18/368,478

(22) Filed: Sep. 14, 2023

(65) Prior Publication Data

US 2025/0094435 A1  Mar. 20, 2025

(51) Int. Cl.
*G06F 16/00* (2019.01)
*G06F 9/451* (2018.01)
*G06F 16/2458* (2019.01)
*G06F 16/25* (2019.01)

(52) U.S. Cl.
CPC ............ *G06F 16/254* (2019.01); *G06F 9/451* (2018.02); *G06F 16/2471* (2019.01); *G06F 16/256* (2019.01)

(58) Field of Classification Search
CPC ... G06F 16/254; G06F 16/256; G06F 16/2471

USPC .......................................................... 707/602
See application file for complete search history.

(56) References Cited

U.S. PATENT DOCUMENTS

| | | | |
|---|---|---|---|
| 2015/0347541 A1* | 12/2015 | Holmes | G06F 3/0484 707/602 |
| 2020/0301939 A1* | 9/2020 | Hollander | G06F 16/2471 |
| 2023/0066110 A1* | 3/2023 | Bodziony | G06F 16/24535 |

* cited by examiner

*Primary Examiner* — Chelcie L Daye
(74) *Attorney, Agent, or Firm* — Procopio, Cory, Hargreave & Savitch LLP

(57) ABSTRACT

Typically, in-depth domain knowledge is required to efficiently query a data system. Accordingly, embodiments are disclosed for a no-code method for implementing data operations, such as extract, transform, load (ETL) operations on third-party platforms, such as enterprise resource planning (ERP) platforms. Disclosed embodiments may provide a graphical user interface that enables a user to construct a blueprint of a data operation using drag-and-drop operations on a virtual canvas. The blueprint may be translated into ETL instructions that are deployed on a proxy service for simplified access via a uniform resource locator (URL). When the URL is accessed, the proxy service may execute the ETL instructions to communicate with a domain-specific engine on a third-party platform to obtain the results of the data operation. These results may also be periodically cached according to time-to-live intervals to reduce overall retrieval times.

17 Claims, 10 Drawing Sheets

NO-CODE METHOD FOR INTEGRATING COMPLEX DATA TOPOLOGIES

BACKGROUND

Field of the Invention

The embodiments described herein are generally directed to data integration, and, more particularly, to a no-code method for the integration of data, which may have complex topologies.

Description of the Related Art

Many data systems require in-depth domain knowledge to efficiently query the data. For example, for efficient extract, transform, load (ETL) operations on enterprise resource planning (ERP) data (e.g., as managed by a software package provided by SAP SE of Walldorf, Baden-Württemberg, Germany), users must generally write programs in the Advanced Business Application Programming (ABAP) programming language to join, filter, and transform the ERP data for integration into external systems. Even though ABAP is a high-level programming language, a user must still have domain knowledge, including programming expertise, to write programs implementing ETL operations.

SUMMARY

Accordingly, systems, methods, and non-transitory computer-readable media are disclosed for a no-code method for implementing ETL and other data operations, which does not require domain expertise, even when the data possess complex topologies.

In an embodiment, a method comprises using at least one hardware processor to: receive a blueprint of a data operation; translate the blueprint into one or more extract, transform, load (ETL) instructions that implement an application programming interface (API) call to an API of an engine to perform the data operation; deploy the ETL instructions on an engine service, wherein deploying the ETL instructions comprises assigning a uniform resource locator (URL) to the API call; and execute the engine service to, in response to an access of the URL by an accessor, when results of the data operation are not cached, execute the ETL instructions to implement the API call to the engine, receive the results of the data operation from the engine, and return the results of the data operation to the accessor.

The blueprint may comprise a plurality of data objects and one or more connections between the plurality of data objects. Receiving the blueprint may comprise: generating a graphical user interface comprising a virtual canvas; receiving a user placement of a visual representation of each of the plurality of data objects on the virtual canvas, wherein the plurality of data objects comprises a first data object and a second data object; and receiving a user placement of at least one visual connection between the visual representation of the first data object and the visual representation of the second data object. In an embodiment, the first data object is a first table comprising one or more first fields, wherein the second data object is a second table comprising one or more second fields, and wherein the at least one visual connection connects a representation of one of the first fields in the visual representation of the first table to a representation of one of the second fields in the visual representation of the second table. Translating the blueprint into one or more ETL instructions may comprise generating a query object that defines a join between the first table and the second table, on the one of the first fields and the one of the second fields, for a database query. The graphical user interface may further comprise a list that includes a visual representation of each of a plurality of available data objects, wherein receiving the user placement of the visual representation of each of the plurality of data objects on the virtual canvas comprises a user dragging the visual representation of the first data object from the list and dropping the visual representation of the first data object onto the virtual canvas at a first user placement, and the user dragging the visual representation of the second data object from the list and dropping the visual representation of the second data object onto the virtual canvas at a second user placement. Receiving the user placement of the at least one visual connection may comprise successively receiving a selection of a first component of the first data object that is visually represented in the visual representation of the first data object, and a selection of a second component of the second data object that is visually represented in the visual representation of the second data object. The first data object may be a first table and the first component may be a field in the first table, and the second data object may be a second table and the second component may be a field in the second table.

The method may further comprise using the at least one hardware processor to execute the engine service to, in response to the access of the URL by the accessor: determine whether or not the results of the data operation are cached in a memory cache; and, when the results of the data operation are cached, retrieve the results of the data operation from the memory cache, and return the retrieved results of the data operation to the accessor without executing the ETL instructions. The method may further comprise using the at least one hardware processor to: maintain a record for each of one or more data operations to be cached, wherein each record comprises a time-to-live interval; and, for each of the one or more data operations to be cached, upon expiration of the time-to-live interval in the record for that data operation, execute the ETL instructions to implement the API call to the engine for that data operation, receive the results of that data operation from the engine, and store the received results of that data operation in the memory cache in association with that data operation. For each of the one or more data operations to be cached, the time-to-live interval in the record for that data operation may be acquired from the blueprint of that data operation. The time-to-live interval may be user specified. The record for each of the one or more data operations may further comprise a token that indicates a most recent time in which that data operation was performed. The method may further comprise using the at least one hardware processor to, for each of the one or more data operations to be cached, receive the token from the engine with the results of that data operation.

The engine may be hosted on a third-party platform that is remote from the at least one hardware processor, the API call to the engine may be sent over at least one network, and the results of the data operation from the engine may be received over the at least one network.

The method may further comprise using the at least one hardware processor to incorporate the URL into an integration process.

The ETL instructions may be configured to: generate a data object that defines the data operation; and send the data object to the engine via the API of the engine.

It should be understood that any of the features in the methods above may be implemented individually or with any subset of the other features in any combination. Thus, to the extent that the appended claims would suggest particular dependencies between features, disclosed embodiments are not limited to these particular dependencies. Rather, any of the features described herein may be combined with any other feature described herein, or implemented without any one or more other features described herein, in any combination of features whatsoever. In addition, any of the methods, described above and elsewhere herein, may be embodied, individually or in any combination, in executable software modules of a processor-based system, such as a server, and/or in executable instructions stored in a non-transitory computer-readable medium.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

In an embodiment, systems, methods, and non-transitory computer-readable media are disclosed for a no-code method for implementing data operations. After reading this description, it will become apparent to one skilled in the art how to implement the invention in various alternative embodiments and alternative applications. However, although various embodiments of the present invention will be described herein, it is understood that these embodiments are presented by way of example and illustration only, and not limitation. As such, this detailed description of various embodiments should not be construed to limit the scope or breadth of the present invention as set forth in the appended claims.

1. Example Architecture

Figure 1:
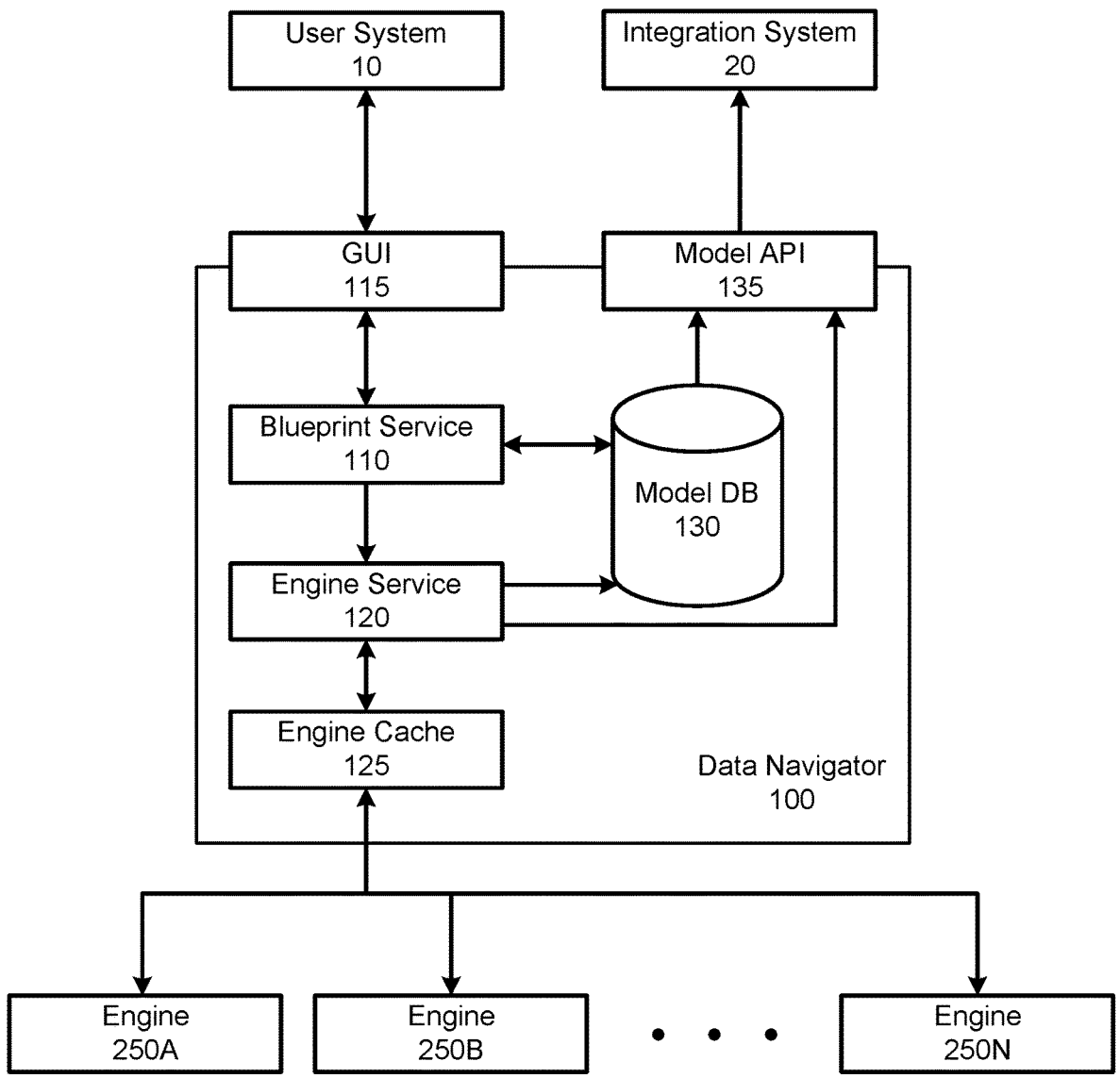
FIG. 1 illustrates an example architecture, in which one or more of the processes described herein may be implemented, according to an embodiment.

FIG. 1 illustrates an example architecture, in which one or more of the processes described herein may be implemented, according to an embodiment. The architecture comprises a data navigator 100, which includes a blueprint service 110, engine service 120, and a model database 130. Data navigator 100 may be hosted and/or executed on a platform. This platform may comprise dedicated servers, or may instead be implemented in a computing cloud, in which the resources of one or more servers are dynamically and elastically allocated to multiple tenants based on demand. In either case, the servers may be collocated and/or geographically distributed. It should be understood that the platform may provide other services, in addition to those provided by data navigator 100, such that data navigator 100 is one component of a larger software package.

Blueprint service 110 provides a no-code layer for the construction of blueprints via a graphical user interface 115. In particular, blueprint service 110 may generate and serve graphical user interface 115 to one or more user systems 10. As described elsewhere herein, graphical user interface 115 may enable a user at user system 10 to explore and define relationships between a plurality of data objects, stored as models in model database 130, via the manipulation of visual representations of those data objects. Examples of a data object include, without limitation, a table of a relational database, a function (e.g., that retrieves, generates, or otherwise outputs data, otherwise manipulates data, etc.), an application programming interface, an event, a proxy service, and/or any other type of data that can be related to other data and/or retrieved from a data source.

Graphical user interface 115 may comprise a drag-and-drop interface with a virtual canvas that enables the user to move the visual representations of data objects around on the virtual canvas and connect the components of different data objects to form relationships between the data objects. Thus, for example, a user may place a visual representation of a first data object on the virtual canvas, place a visual representation of a second data object on the virtual canvas, and place a visual connection between a first component in the visual representation of the first data object and a second component in the visual representation of the second data object to specify a relationship between the first and second components. Graphical user interface 115 may comprise one or more screens (e.g., webpages) that include a combination of content and elements, such as text, images, videos, animations, references (e.g., hyperlinks), frames, inputs (e.g., textboxes, text areas, checkboxes, radio buttons, drop-down menus, buttons, forms, etc.), scripts (e.g., JavaScript), and the like, including elements comprising or derived from data stored in model database 130.

The user may manipulate interactive elements in the drag-and-drop interface of graphical user interface 115 to explore or "play around with" the data objects, which may exist within a complex topology. By providing this no-code layer for users to describe relationships between data objects, users can easily reason how to perform data operations without needing to write any code for those data operations and without extensive domain knowledge. Rather, the user simply creates a blueprint of a data operation that can then be used to write the code for the data operation. All the user needs to understand is the business problem at hand.

The user of a user system 10 may utilize blueprint service 110 to construct a blueprint of a data operation via graphical user interface 115. Each blueprint may comprise one or more data objects and one or more connections between the data object(s). While a blueprint could consist of a single data object (e.g., with no connections or one or more connections between components within the same data object), a typical blueprint will comprise two or more data objects with at least one connection between those data objects or components of those data objects. The blueprint, as visually represented in graphical user interface 115, may be similar to a Unified Modeling Language (UML) diagram.

Blueprint service 110 may store and manage the blueprints, generated by one or more users, in model database 130. In addition to saving blueprints, blueprint service 110 may enable a user to subsequently retrieve associated blueprints from model database 130 for review, editing, copying, cloning, deletion, and/or the like, via graphical user interface 115.

Graphical user interface 115 may enable the user to deploy a blueprint of a data operation to engine service 120. In this case, blueprint service 110 or engine service 120 may translate the blueprint into a set of one or more extract, transform, load (ETL) instructions. The ETL instructions may define the set of data, encompassed by the blueprint in a programming language, as a new data object, and send that new data object to an engine 250 via a call to an API of engine 250. In other words, the blueprint, constructed using visual representations of data objects on a virtual canvas, is translated into a set of programming instructions that create a data object, representing the blueprint, and send that data object to an engine 250. The data object may be sent to engine 250 using the well-known POST request or other request mechanism. In an embodiment, the ETL instructions define the data object in a format that facilitates storage and transmission, such as JavaScript Object Notation (JSON), extensible Markup Language (XML), or the like. The ETL instructions may also implement any security protocol (e.g., credentials, digital certificate, etc.) required to access engine 250.

Engine service 120 may execute the ETL instructions to construct the data object, and send the data object to an engine 250. In the case that the data object(s) represented in the blueprint comprise tables, the data object constructed and sent by the ETL instructions may represent a query of those tables. For example, the blueprint may comprise a first data object that is a first table comprising one or more first fields, a second data object that is a second table comprising one or more second fields, and a connection between one of the first fields in the first table and one of the second fields in the second table. In this example, the ETL instructions may generate a query object that indicates a joinder of the first and second tables, on the connected fields, for a database query. The ETL instructions may then send the query object to an engine 250 to be converted into a database query, in structured query language (SQL) or other language, and run against a database (e.g., on a third-party platform).

In an embodiment, engine service 120 utilizes an engine cache 125. Engine cache 125 is a local memory cache that caches the results returned by engine 250. For example, the results may be the data returned by a database query. These results may be cached in engine cache 125, according to a caching mechanism described elsewhere herein. In response to receiving a call for a data operation and before executing the ETL instructions for the data operation, engine service 120 may first check engine cache 125 to determine whether or not the results of the data operation already exist in engine cache 125. If current results of the data operation are cached in engine cache 125, engine service 120 may retrieve and return the results from engine cache 125 in response to the call for the data operation, instead of and without executing the ETL instructions. The use of a local memory cache in this manner reduces computational time and conserves computational resources.

In an embodiment, engine service 120 may communicate with a plurality of engines 250, illustrated as engines 250A, 250B, . . . , 250N. It should be understood that engine service 120 may communicate with any number of engines 250. Each engine 250 may operate independently from each other engine 250 and support a different third-party software package or different instantiation of the same third-party software package. For example, engine 250A could be a SAP engine that supports a software package provided by SAP SE, engine 250B could be an Ariba engine that supports a software package provided by SAP Ariba of Palo Alto, California, and engine 250N could be a Salesforce engine that supports a software package provided by Salesforce, Inc. of San Francisco, California. It should be understood that these are simply examples and that an engine 250 can be designed to support virtually any software package.

All of the ETL instructions managed by engine service 120 may be defined in a manner that abstracts the details of the particular software package being supported by each engine 250. Thus, the same ETL instructions may be used regardless of the particular engine 250 to which the ETL instructions are generating and sending a data object. In other words, the domain-specific details of each particular software package may be managed by the individual engines 250, instead of by engine service 120. These domain-specific engines 250 may be hosted on the same platform as data navigator 100 (e.g., or even within data navigator 100 itself) or in a separate host environment, such as a third-party platform. The separation between data navigator 100 and domain-specific engines 250 enables data navigator 100 to be hosted anywhere, managed separately, and serve the same graphical user interface 115, regardless of the software package(s) that data navigator 100 is supporting.

Data navigator 100 may store the data generated and/or used by blueprint service 110 and/or engine service 120 within model database 130. For example, model database 130 may store machine-readable representations of the blueprints, ETL instructions, data objects, and/or the like. Engine service 120 and/or the data in model database 130 may be accessible via a model API 135. In particular, data navigator 100 may provide a model API 135 that provides for the retrieval of data from model database 130, calls to engine service 120, and/or other functions of data navigator 100.

As an example, an integration configuration system 20 may access one or more of these functions of navigator 100. For instance, an integration process, executing on integration system 20, may call engine service 120, through model API 135, to execute a data operation implemented in ETL instructions by engine service 120. The integration process may represent a transaction involving the integration of data between two or more systems, and may comprise a series of steps that specify logic and transformation requirements for the data to be integrated. Each step may transform, route, and/or otherwise manipulate data to attain an end result from input data. For example, an initial step (e.g., connector) in an integration process may retrieve data from one or more data sources via a call to engine service 120, may manipulate the retrieved data in a specified manner (e.g., including analyzing, normalizing, altering, updated, enhancing, augmenting, etc.), and in a final step, send the manipulated data to one or more specified destinations. An integration process may represent a business workflow or a portion of a business workflow or a transaction-level interface between two systems, and comprise, as one or more steps, software modules that process data to implement the business workflow or interface. A business workflow may comprise any myriad of workflows of which an organization may repetitively have need. For example, a business workflow may comprise, without limitation, procurement of parts or materials, manufacturing a product, selling a product, shipping a product, ordering a product, billing, managing inventory or assets, providing customer service, ensuring information security, marketing, onboarding or offboarding an employee, assessing risk, obtaining regulatory approval, reconciling data, auditing data, providing information technology services, and/or any other workflow that an organization may implement in software.

Notably, engine service 120 is a proxy service that performs the communications with engine 250 that are necessary to perform a data operation (e.g., query a database on a third-party platform). Engine service 120 may also be responsible for caching results of data operations, may perform transformations on the results of data operations (e.g., prior to returning the results of the data operations to callers of the proxy service), and/or the like. In an embodiment, when the ETL instructions, implementing a blueprint of a data operation as an API call, are deployed, a unique uniform resource locator (URL) may be assigned to the API call. This URL may be incorporated into an integration process or otherwise used as a proxy for the API call. In response to an access of the URL by an accessor (e.g., a user, integration system 20, another system, etc.), when the results of the corresponding data operation are not cached, engine service 120 may execute the ETL instructions to implement the API call to engine 250, receive the results of the data operation from engine 250, and return the results of the data operation to the accessor. Notably, the URL assigned to a particular data operation may be easily integrated into any overarching software, and can even be sold or otherwise shared as an interface that can be used for Representational State Transfer (REST), remote procedure calls (RPCs), an embedded API, and/or the like.

User system 10 and/or integration system 20 may communicate with graphical user interface 115 and model API 135, respectively, via one or more networks. Similarly, engine service 120 and/or engine cache 125 may communicate with engines 250 via one or more networks. Thus, graphical user interface 115 may be served over at least one network, communications between integration system 20 and model API 135 may be sent over at least one network, API calls for data operations from engine service 120 to engine 250 and the results of the data operations may be sent over at least one network, and/or the like. The network(s) may comprise the Internet, and the communications may utilize standard transmission protocols, such as HyperText Transfer Protocol (HTTP), HTTP Secure (HTTPS), File Transfer Protocol (FTP), FTP Secure (FTPS), Secure Shell FTP (SFTP), and the like, as well as proprietary protocols. While only a single user system 10 and integration system 20 are illustrated, it should be understood that data navigator 100 may serve any number of user systems 10 and/or integration systems 20.

User system(s) 10 may comprise any type or types of computing devices capable of wired and/or wireless communication, including without limitation, desktop computers, laptop computers, tablet computers, smart phones or other mobile phones, servers, game consoles, televisions, set-top boxes, electronic kiosks, point-of-sale terminals, and/or the like. However, it is generally contemplated that a user system 10 will be the personal or professional computing device of an agent of an operator of an integration system 20. The agent will authenticate with blueprint service 110 via graphical user interface 115, using standard authentication mechanism(s), and utilize graphical user interface 115 to construct blueprints of data operations to be deployed on engine service 120 for use with integration system 20.

2. Third-Party Platform

Figure 2:
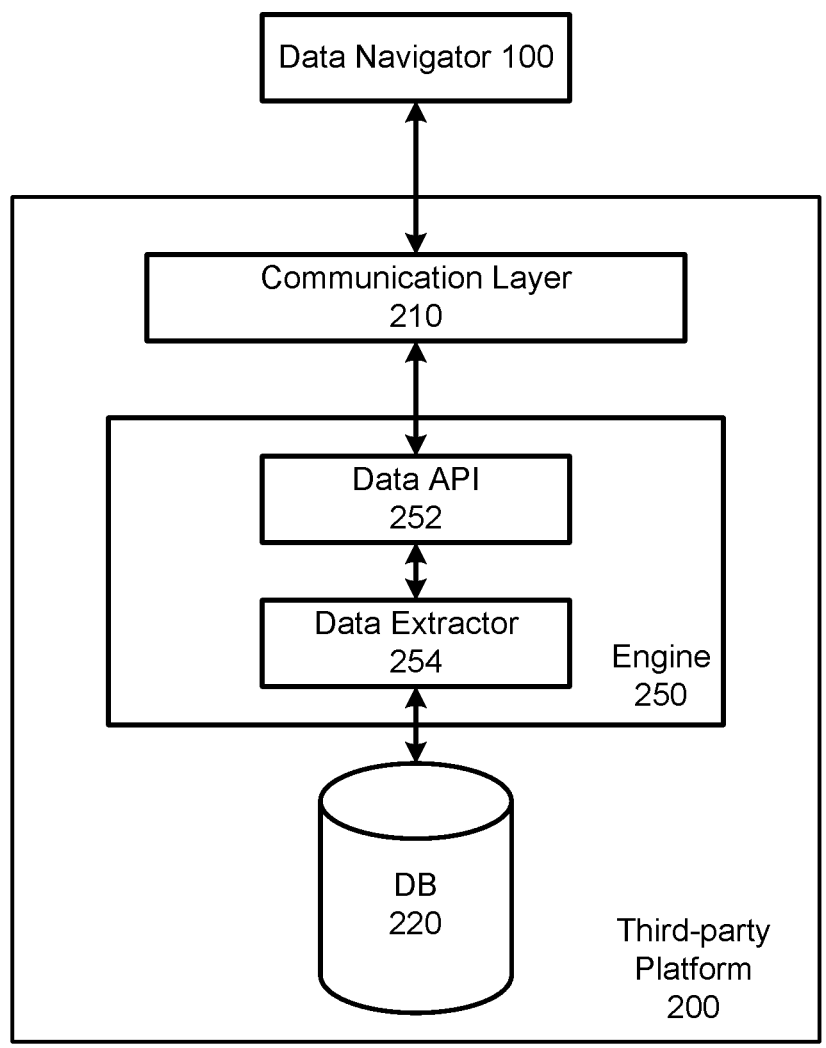
FIG. 2 illustrates an example engine for a third-party platform, according to an embodiment.

FIG. 2 illustrates an example engine 250 for a third-party platform 200, according to an embodiment. In this embodiment, engine 250 is hosted on a third-party platform 200 that is remote from data navigator 100. In particular, data navigator 100 may communicate with third-party platform 200 over one or more networks. For example, engine service 120 of data navigator 100 may send API calls, requesting data operations, to engine 250 over at least one network, and engine 250 may return the results of the data operations to engine service 120 over the at least one network.

Data navigator 100 may communicate with engine 250 via a communication layer 210 of third-party platform 200. For example, if third-party platform 200 is a SAP platform (i.e., supporting SAP software), communication layer 210 may be the Internet Communication Framework (ICF). The Internet Communication Framework is the layer between the Internet Communication Manager (ICM), which sends and receives HTTP requests, and the SAP web application server work process. Other platforms may comprise similar communication layers 210. Third-party platform 200 may provide an API that enables data navigator 100 to communicate to engine 250 through communication layer 210.

Each engine 250 may comprise a data API 252 and a data extractor 254. Data navigator 100 may communicate with engine 250 via data API 252. Each data API 252 may abstract the inner workings of engine 250 (e.g., data extractor 254), such that each engine 250 comprises the same data API 252, regardless of the software package that is being supported by that engine 250. In this manner, engine service 120 may communicate with all engines 250 in the same manner, without having to know the inner workings of each engine 250 or what software package is being supported by that engine 250.

Data extractor 254 is configured to receive a data object, generated and sent by ETL instructions deployed on engine service 120, via data API 252, and translate that data object into a data operation configured for the particular software package of the third-party system 200 on which engine 250 is operating. For example, in the case that third-party system 200 is a SAP system, engine 250 may be an ABAP program running in a customer's SAP instance on the SAP system. The data operation may be an operation on data stored in database 220 of third-party platform 200. For example, the data object may represent a database query (e.g., a table query, join, load, etc.), and the data operation may be a database query to database 220.

Data extractor 254 may be domain-specific to each software package. For example, an engine 250 that supports a SAP software package may comprise a data extractor 254 that is specific to the data schema used by the SAP software package. In particular, data extractor 254 may map or otherwise translate the abstract data schema utilized by engine service 120 and data API 252 into the domain-specific data schema used by third-party platform 200 and database 220. In the case of a database query, data extractor 254 may map the field and table names in the data object sent by the ETL instructions into a specific query for database 220. Thus, engine service 120 is able to operate with all engines 250 in the same generic manner, while each engine 250 accounts for the particular domain-specific details required to perform each data operation.

It should be understood that third-party platform 200 may comprise a database 220 that stores data for a customer of third-party platform 200. For example, a SAP platform may store SAP data for its customers. These customers may create integration processes on integration system 20 that utilize (e.g., retrieve, manipulate, and/or store) customer data in database 220 on third-party platform 220. Thus, an agent of the customer may utilize blueprint service 110 of data navigator 100 to create a blueprint of a data operation to be performed on the customer data, deploy that blueprint to engine service 120, and link the URL assigned to that data operation to an integration process. Data navigator 100, and particularly engine service 120, may then communicate with engine 250 on third-party platform 200, whenever the URL is accessed, to perform the data operation on the customer data in database 220. In this manner, engine service 120 acts as a proxy service for the performance of data operations on customer data by a customer's integration processes on integration system 20.

3. Example Data Flow

Figure 3:
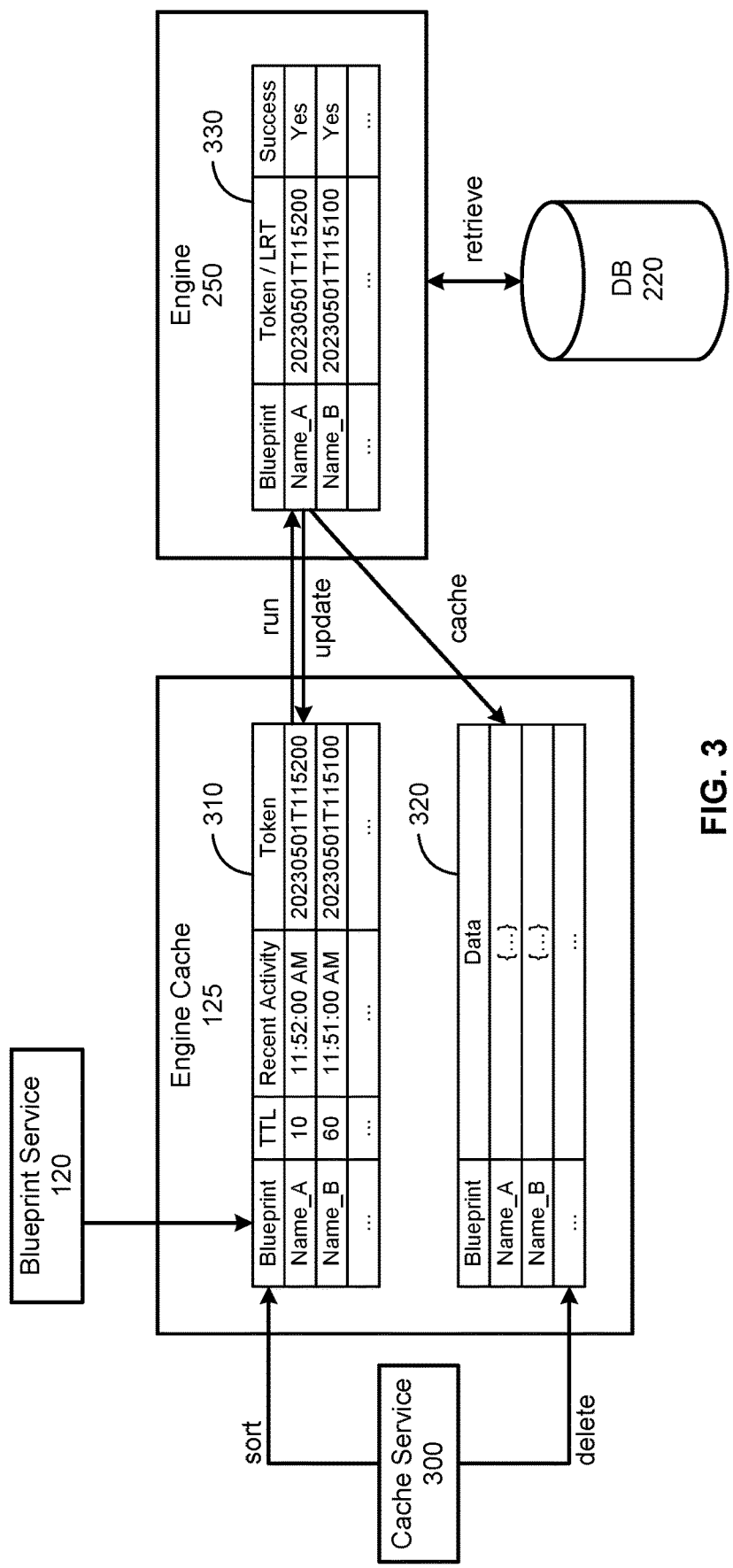
FIG. 3 illustrates an example of a caching mechanism, according to an embodiment.

FIG. 3 illustrates an example of a caching mechanism, according to an embodiment. Caching may be implemented by a cache service 300, which may be integrated into engine service 120 or may be a separate service from engine service 120 within data navigator 100. In either case, cache service 300 manages engine cache 125. For example, cache service 300 may manage a metadata table 310 and data table 320 in engine cache 125. Cache service 300 may run in the background, enabling continuous, uninterrupted caching for optimal performance of data operations through the proxy service provided by engine service 120. Essentially, engine cache 125 acts as a proxy for engine 250 that significantly reduces the time required to obtain the results of a data operation.

Metadata table 310 may store a record for each blueprint, generated by blueprint service 120. Each record represents a data operation to be cached. In an embodiment, when generating the blueprint, a user may specify that the data operation is to be cached. In particular, the user may specify a time-to-live (TTL) interval, representing the periodicity or frequency of the caching. Thus, a user can customize the frequency by which certain data operations are cached. For instance, for important or high-frequency data operations, the user may specify a short TTL interval in order to minimize delays for those data operations.

In an embodiment, a user may specify (e.g., when constructing a blueprint) that a particular data operation should not be cached, for example, by setting the TTL interval to zero or some other invalid or predefined value. In this case, the data operation will always be performed in real time. In other words, engine service 120 will only return new data, as opposed to cached data. This ensures that the latest results will be returned for that data operation, while optimizing storage. Such real-time data operations may be appropriate for monitoring data that may be updated continually or continuously, such as sensor data. More generally, one or more criteria, which may include whether or not a valid TTL interval has been set, may be used to determine whether or not a data operation should be cached.

Each record (e.g., stored as a row) in metadata table 310 may comprise an identifier of the blueprint, the TTL interval, a date and/or time of the most recent activity (e.g., timestamp for the last time on which the data operation was requested), and a token. The token may indicate the date and time on which the data operation was most recently performed. In the illustrated example, the token comprises a string representing the date of the most recent caching (e.g., "20230501" representing May 1, 2023 for the blueprint "Name_A"), appended with a string representing the time of the most recent caching (e.g., "T115200" representing the time 11:52:00 AM for the blueprint "Name_A"). Cache service 300 may sort metadata table 310 as needed, for example, on the "Recent Activity" column from most recent activity to least recent activity (i.e., reverse chronological order).

Data table 320 may store the data for each blueprinted data operation that has been cached. In particular, whenever a data operation to be cached is performed, the results of the data operation may be stored in data table 320 in association with an identifier of the blueprint representing the data operation. Cache service 300 may delete the least recently used data in data table 320 as needed (e.g., to ensure that the memory cache does not exceed its capacity), to ensure efficient utilization of the engine cache 125. In addition, cache service 300 may delete any data from data table 320 that is known to no longer be valid (e.g., the results of a data operation for which the data have changed).

Whenever engine service 120 executes ETL instructions, representing a database operation to be cached, engine 250 may perform the database operation (e.g., a database query on database 220 to retrieve the results). Engine 250 may utilize an operation table 330 that stores a record for each blueprinted data operation to be cached. Each record (e.g., stored in a row) in operation table 330 may comprise the identifier of the blueprint, a token indicating the date and time on which the data operation was most recently performed, and a flag indicating whether or not the data operation was successful. The token may be generated after a successful data operation and returned to cache service 300, along with the results of the data operation. Cache service 300 may then update metadata table 310 with the new token for the associated blueprint, and cache the results of the data operation in data table 320. By employing tokens, cache service 300 can intelligently retrieve fresh data, while providing the flexibility to access all historical records in the absence of a token.

4. Example Process

Figure 4:
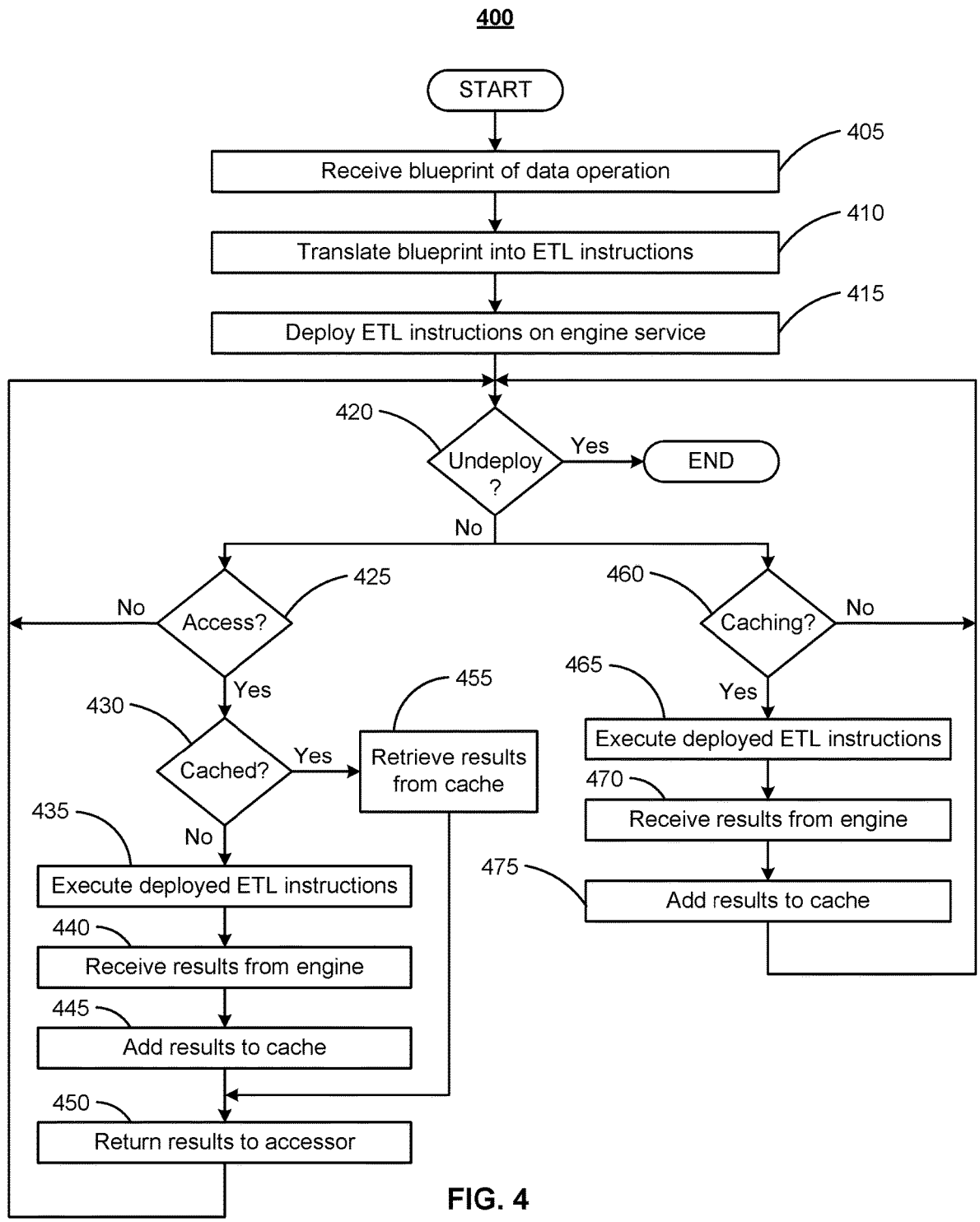
FIG. 4 illustrates a process for a no-code implementation of a data operation, according to an embodiment.

FIG. 4 illustrates a process 400 for a no-code implementation of a data operation, according to an embodiment. Process 400 may be performed by data navigator 100. In particular, process 400 may be implemented by a combination of blueprint service 110, engine service 120, and/or cache service 300. An iteration of process 400 may be performed for each blueprint that is managed by data navigator 100.

While process 400 is illustrated with a certain arrangement and ordering of subprocesses, process 400 may be implemented with fewer, more, or different subprocesses and a different arrangement and/or ordering of subprocesses. For example, in an embodiment which does not utilize the caching mechanism, the subprocesses related to the caching mechanism may be omitted. In addition, it should be understood that any subprocess, which does not depend on the completion of another subprocess, may be executed before, after, or in parallel with that other independent subprocess, even if the subprocesses are described or illustrated in a particular order.

Initially, in subprocess 405, a blueprint of a data operation may be received. For example, as discussed elsewhere herein, blueprint service 120 may generate the blueprint based on user operations performed via graphical user interface 115. In particular, the user may arrange visual representations of data objects and visual connection(s) between the data objects on a virtual canvas within graphical user interface 115. Blueprint service 120 may generate the blueprint by representing these data object(s) and connection (s) within a data structure stored in model database 130.

In subprocess 410, the blueprint, received in subprocess 405, may be translated into one or more ETL instructions that implement an API call to data API 252 of an engine 250 to perform the data operation represented by the blueprint. For example, blueprint service 110 or engine service 120 may generate ETL instructions that instantiate a data object and post or otherwise send the data object to a data API 252 of a particular engine 250. These ETL instructions may also implement any security protocols required to access data API 252.

In subprocess 415, the ETL instructions, generated in subprocess 410, may be deployed on engine service 120. This deployment may comprise assigning a URL to the ETL instructions. The URL may be made accessible, with appropriate security protocols, through engine service 120 as a proxy service for the API call. The URL may be provided to the user who constructed the blueprint, for use in an integration process or other utilization.

Once the ETL instructions have been deployed, the ETL instructions may remain accessible until being undeployed. The ETL instructions may be undeployed by a user via graphical user interface 115 or in some other manner. When the ETL instructions are undeployed (i.e., "Yes" in subprocess 420), process 400 may end. Otherwise, while the ETL instructions remain deployed (i.e., "No" in subprocess 420), the ETL instructions may be executed whenever properly accessed (e.g., according to an established security protocol) in subprocess 425 and, if the data operation is to be periodically cached, whenever the TTL interval expires in subprocess 460.

In subprocess 425, it is determined whether or not the URL, assigned to the ETL instructions upon deployment, has been accessed. The URL may be accessed by an integration process in integration system 20, manually by a user, and/or the like. In an embodiment, a security protocol (e.g., credentials, digital certificate, etc.) may be required before accessing the URL. Whenever the URL is accessed (i.e., "Yes" in subprocess 425), process 400 proceeds to subprocess 430. Otherwise (i.e., "No" in subprocess 425), process 400 continues to wait and monitor for accesses of the URL.

In subprocess 430, it is determined whether or not current results of the data operation, represented by the ETL instructions, assigned to the URL accessed in subprocess 425, have been cached in engine cache 125. It is assumed that, if the results of a data operation remain in engine cache 125, then those results are still valid (i.e., the supporting data have not changed). In an alternative embodiment, engine service 120 may verify that the results are still valid. When the current results of the data operation are not cached (i.e., "No" in subprocess 430), process 400 proceeds to subprocess 435. Otherwise, when the current results of the data operation are cached (i.e., "Yes" in subprocess 430), process 400 proceeds to subprocess 455.

In subprocess 435, the ETL instructions, assigned to the URL accessed in subprocess 425, are executed. In particular, the ETL instructions may instantiate a data object, defining a data operation, and send the data object to a data API 252 of an engine 250. In response, engine 250 may execute data extractor 254 to translate the data object into the data operation, execute the data operation (e.g., against database 220), and return the results of the data operation to engine service 120.

In subprocess 440, the results are received by engine service 120 from engine 250. In addition, in subprocess 445, the results may be added to engine cache 125 by cache service 300. Then, in subprocess 450, the results are returned to the accessor that accessed the URL in subprocess 425. The accessor may be an integration process executing on integration system 20, another process or system, a user, and/or the like.

In subprocess 455, the results of the data operation are retrieved from the engine cache 125, without executing the ETL instructions, thereby obviating the need to communicate with engine 250. Then, in subprocess 450, the retrieved results may be returned to the accessor that accessed the URL in subprocess 425.

Subprocesses 460-475 implement the caching mechanism described elsewhere herein, and may be implemented by cache server 300. In subprocess 460, it is determined whether or not the data operation is to be cached. For example, a user may specify that a data operation is to be cached when constructing the blueprint for the data operation via graphical user interface 115. In doing so, the user may specify a TTL interval. The TTL interval represents the frequency by which the data operation should be cached. In particular, the data operation may be cached at each expiration of the TTL interval. When it is time for the data operation to be cached (i.e., "Yes" in subprocess 460), process 400 may proceed to subprocess 465. Otherwise when caching is not implemented for the data operation or it is not time for the data operation to be cached (i.e., "No" in subprocess 460), the data operation is not cached.

In subprocess 465, the ETL instructions for the data operation are executed. In addition, in subprocess 470, the results of the data operation are received from engine 250. Then, in subprocess 475, the results are added to engine cache 125. Subprocesses 465-475 may be similar or identical to subprocesses 435-445, respectively. Thus, any descriptions of subprocesses 465-475 apply equally to subprocesses 435-445, respectively. Accordingly, subprocesses 465-475 will not be redundantly described herein.

Although not explicitly illustrated, in an embodiment, a user may subscribe to data operations. The subscription may operate similarly or identically to caching in subprocesses 460-475. In particular, the user may specify a blueprinted data operation, a subscription frequency, which may be represented as a TTL interval, and a destination. Upon the expiration of each TTL interval, engine service 120 may execute the ETL instructions for the data operation to obtain the results of the data operation or retrieve the results of the data operation from engine cache 125 if cached, and send the results of the data operation to the destination (e.g., an integration process executing on integration system 20). In other words, fresh and potentially real-time data is automatically pushed directly to a user's system, thereby eliminating the need for polling, facilitating timely decision-making, improving productivity, and/or the like. In addition, the results retrieved by this subscription service may be cached using the caching mechanism described elsewhere herein.

5. Example Graphical User Interface

FIGS. 5A-5E illustrate an example of a graphical user interface 115 for no-code construction of a blueprint of a data operation, according to an embodiment. In particular, graphical user interface 115 may comprise a screen 500. It should be understood that screen 500 may be one of a plurality of screens in graphical user interface 115. A user may navigate between screens, including to screen 500, via standard navigational mechanisms.

Figure 5A:
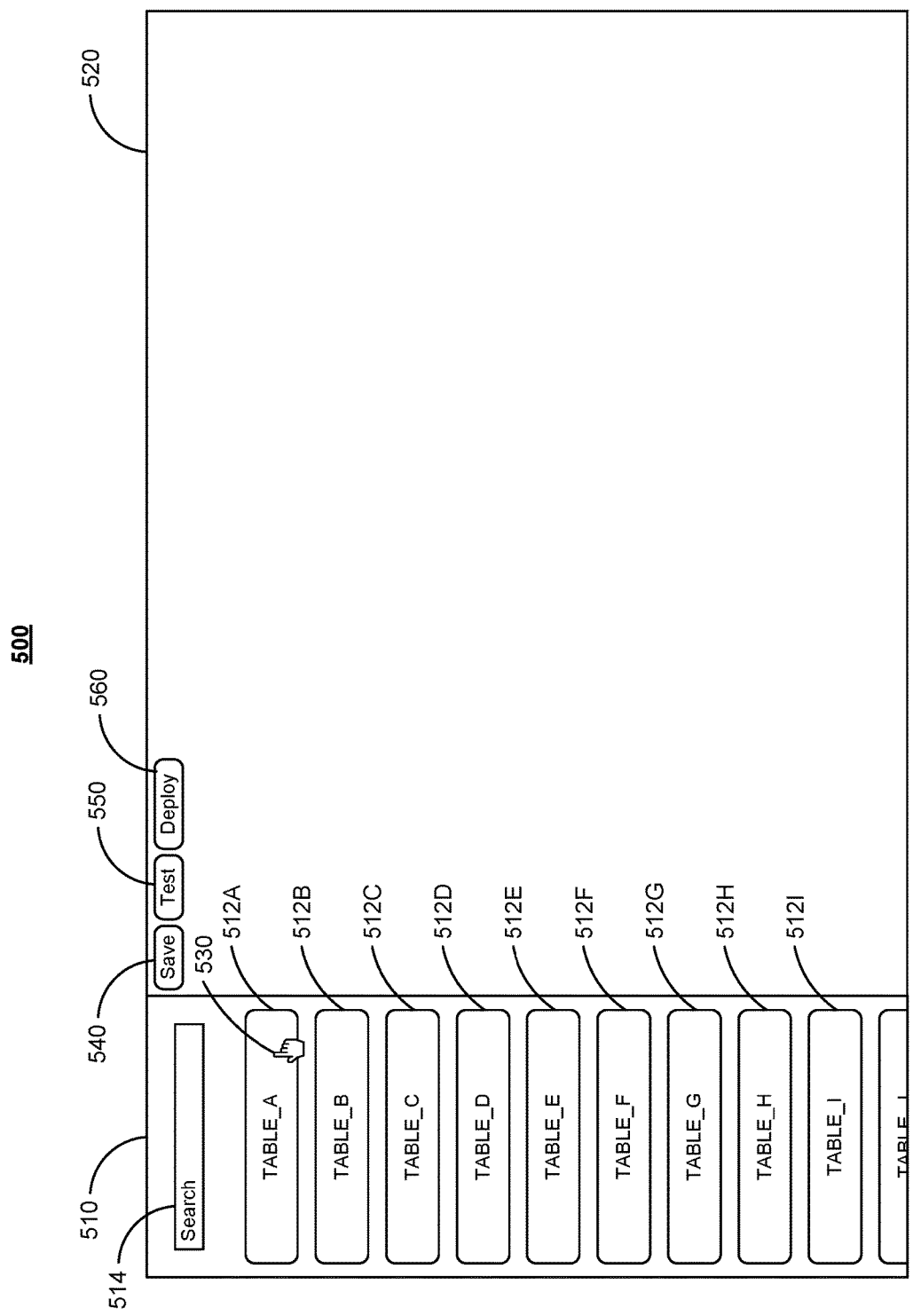
FIGS. 5A-5E illustrate an example of a graphical user interface for no-code construction of a blueprint of a data operation, according to an embodiment.

FIG. 5A illustrates screen 500 prior to construction of a blueprint, according to an embodiment. In an embodiment, screen 500 comprises a selection frame 510 and a virtual canvas 520. Selection frame 510 comprises a visual representation 512 of each of a plurality of data objects (e.g., tables in this example). Each visual representation 512 may comprise an icon (e.g., rectangular icon) that is labeled with an identifier of the data object (e.g., table name). In addition, selection frame 510 may comprise a search input 514 which enables the user to filter the data objects by identifier and/or other attributes. Data objects that do not satisfy the current input in search input 514 (e.g., whose identifiers do not contain the character string in search input 514) may be excluded from the list of data objects visually represented in selection frame 510. This list may be updated in real time as the user inputs characters into search input 514 or, alternatively, after a user has selected a search button (not shown).

In the illustrated example, each data object is a table of customer data within database 220 of a third-party platform 200. However, a data object could also be a function, event, proxy, or any other source of customer or other data. Each data object may represent data that can be related to the data of another data object. For instance, a component of one data object may be linked or otherwise related to a component of another data object. In the case that the data objects are tables, a first table may be joined to a second table by virtue of corresponding fields. Models of the plurality of data objects may be stored in model database 130.

The user may utilize a cursor 530 to drag one or more visual representations 512 of data objects from selection frame 510 onto virtual canvas 520. In the case that user system 10 does not comprise a touch-panel display, cursor 530 may be a visual on-screen cursor manipulated by a mouse, trackball, or other input device. In the case that user system 10 comprise a touch-panel display, cursor 530 may represent a contact point of the user's finger or stylus on the touch-panel display, such that cursor 530 is not actually visible on screen 500. A user may drag a visual representation 512 of a data object by activating cursor 530 (e.g., clicking, contacting, etc.) over the visual representation 512 to "pick up" the visual representation 512, moving the activated cursor 530 with the visual representation 512 to a desired placement on virtual canvas 520, and then deactivating cursor 530 (e.g., unclicking, ending contact, etc.) to "drop" the visual representation 512 at the desired placement on virtual canvas 520.

Figure 5B:
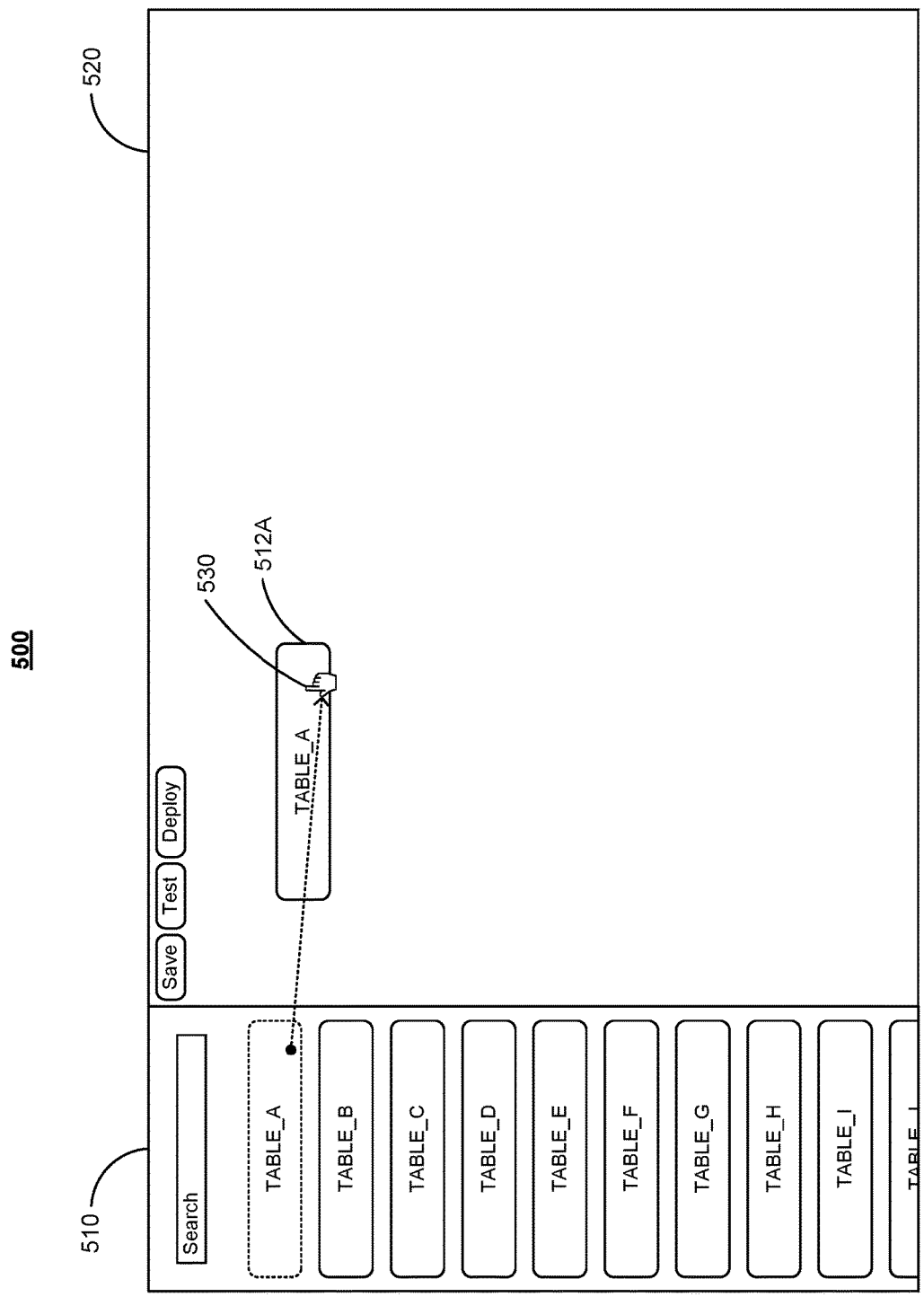
Figure 5C:
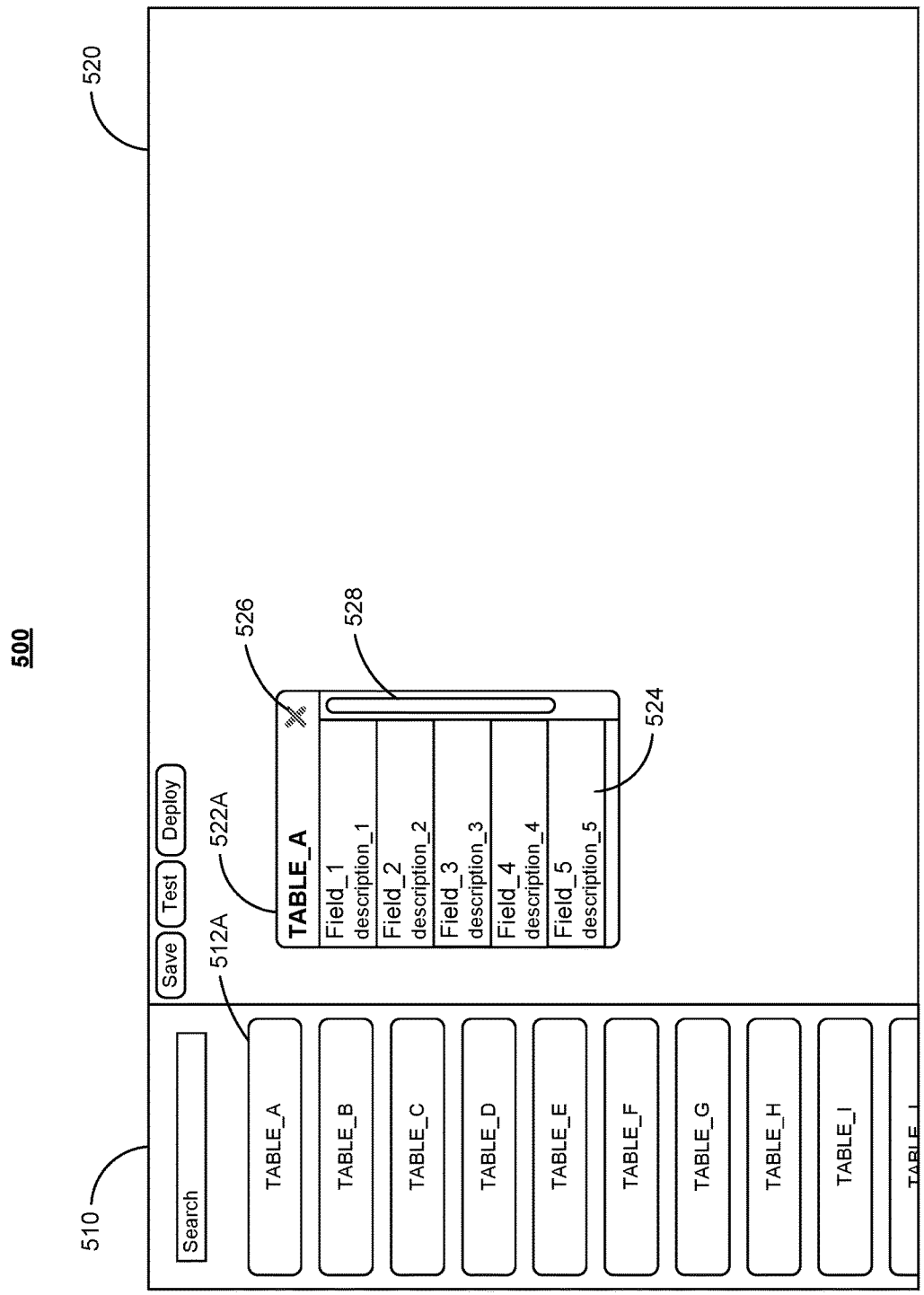

FIG. 5B illustrates the user utilizing cursor 530 to move visual representation 512A to a desired placement on virtual canvas 520, prior to dropping visual representation 512A, and FIG. 5C illustrates screen 500 after the user has dropped visual representation 512A onto virtual canvas 520, according to an embodiment. As illustrated in FIG. 5C, after being dropped, visual representation 512A may be replaced with a more detailed visual representation 522A. In addition, visual representation 512A may be returned to selection frame 510 (in the event that data objects can be selected twice), or may be removed from selection frame 510 or grayed out within selection frame 510 (in the event that data objects cannot be selected twice). It should be understood that any one or more visual representations 512 may be moved from selection frame 510 onto virtual canvas 520 in this manner.

Each visual representation 522 may comprise the identifier of the represented data object, along with any component(s) 524 of the data object, and a deletion input 526 that enables visual representation 522 and the represented data object to be deleted from virtual canvas 520. In the illustrated example, the data object is a table, such that components 524 are fields within the table. If the number of components 524 and/or an initial size of visual representation 522 do not allow all of components 524 to be shown at once, visual representation 522 may comprise a scroll bar 528 to enable the user to scroll through the components. However, it should be understood that visual representation 522 may be a resizable window, such that the user can adjust visual representation 522 to show more (e.g., all) or fewer components 524.

Figure 5D:
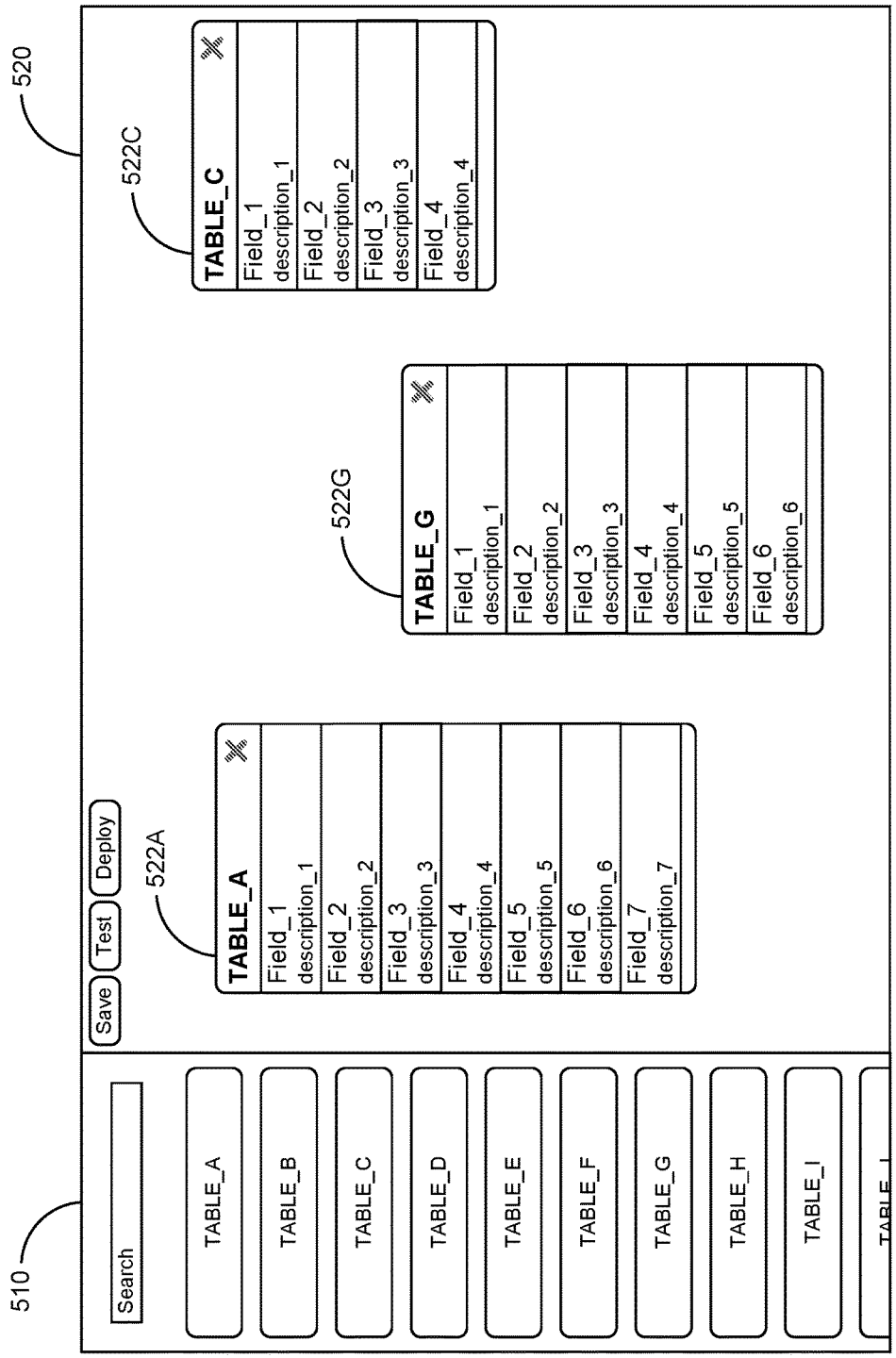

FIG. 5D illustrates screen 500 after a plurality of visual representations 512 have been dragged onto virtual canvas 520, such that a plurality of visual representations 522 of data objects have been placed on virtual canvas 520, according to an embodiment. In particular, visual representations 522A, 522C, and 522G have been placed at different positions on virtual canvas 520. More generally, any number of visual representations 522 may be placed on virtual canvas 520 in this manner. Graphical user interface 115 will receive the user placement of a visual representation 522 of each data object to be used in a blueprint of the data operation being constructed by the user. The user may position visual representations 522 in any desired manner.

Figure 5E:
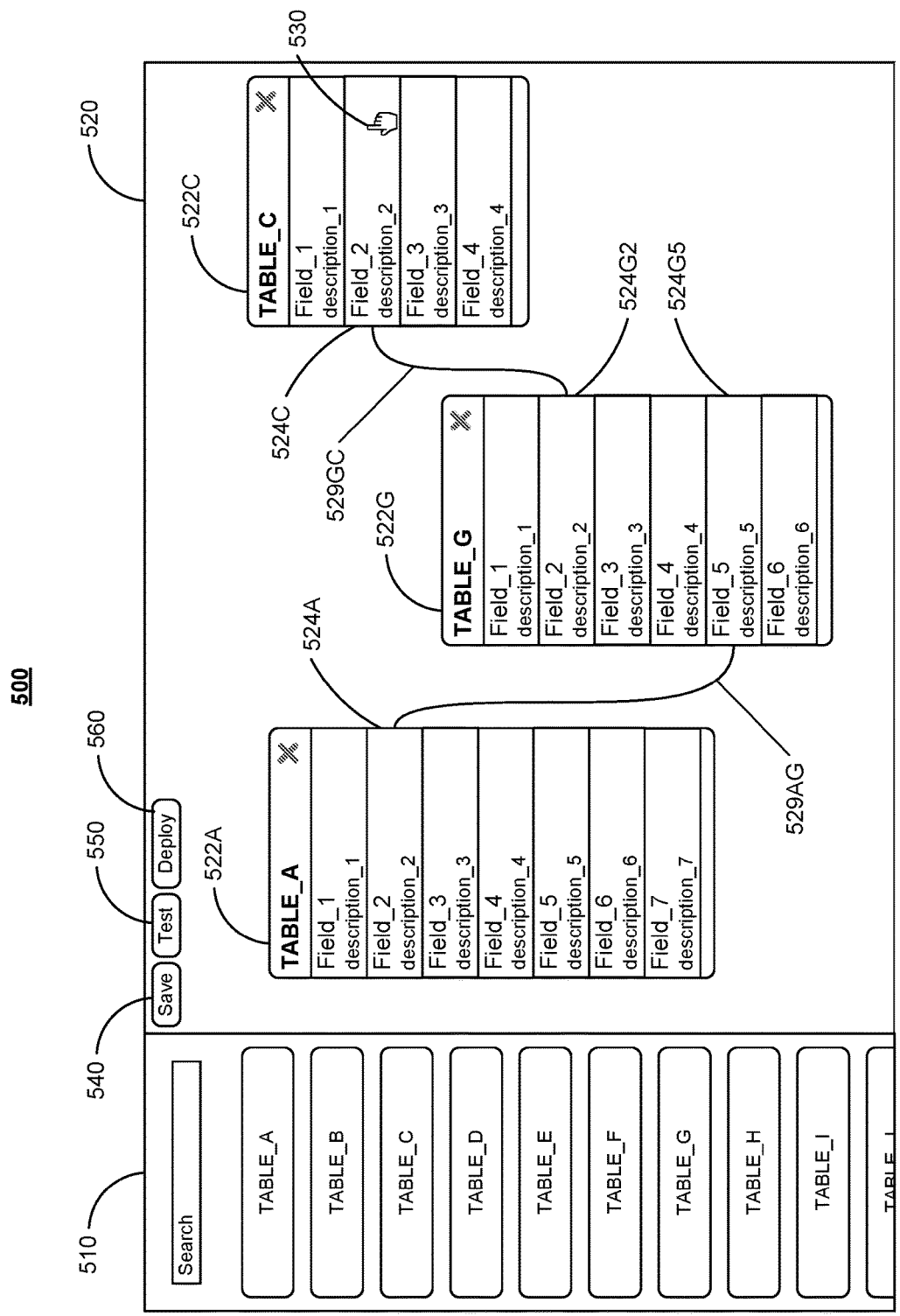

FIG. 5E illustrates screen 500 after the user has added visual connections 529, between visual representations 522, to virtual canvas 520, according to an embodiment. In particular, the user has placed a visual connection 529AG between a component 524A of visual representation 522A and a component 524G5 of visual representation 522G, and a visual connection 529GC between a component 522G2 of visual representation 522G and a component 524C of visual representation 522C. The user may connect the components of visual representations 522 by selecting them with cursor 530. In particular, graphical user interface 115 may receive the user placement of each visual connection 529 between visual representations 522 by receiving selections of the pair of components 524 representing the ends of the visual connection 529.

In this example, Field_2 of Table_A is connected to Field_5 of Table_G by visual connection 529AG, and Field_2 of Table_G is connected to Field_2 of Table_C by visual connection 529GC. To place visual connection 529AG, the user may firstly select component 524A of visual representation 522A with cursor 530, which sets one end of a connection, and then secondly select component 524G5 of visual representation 522G with cursor 530, which sets the other end of the connection and results in the display of visual connection 529AG. Similarly, the user may thirdly select component 524G2 of visual representation 522G, which sets one end of a new connection, and then fourthly select component 524C of visual representation 522C, which sets the other end of the new connection and results in the display of visual connection 529GC.

Once the user is satisfied with the blueprint that is visually represented on virtual canvas 520, the user may save the blueprint using save input 540. In response to the selection of save input 540, blueprint service 110 may save a data structure representing the data operation to model database 130. The data structure may indicate each data object represented by the visual representations 522 on virtual canvas 520, at the time that save input 540 was selected, and define the connections represented by each visual connection 529 on virtual canvas 520, at the time that save input 540 was selected.

The user may also test the blueprint using test input 550. In response to the selection of test input 550, blueprint service 110 and/or engine service 120 may translate the blueprint into ETL instructions, execute those ETL instructions to perform the data operation on engine 250, and display the results of the data operation to the user in graphical user interface 115 (e.g., on a new screen, or in a frame overlaid on screen 500). The results may be displayed in a scrollable table format with a heading and rows, such that the user can easily view the data that is returned by the data operation. In this manner, the user can easily verify that the blueprint properly represents the data operation, so as to return the correct results.

The user may also deploy the blueprint using deploy input 560. In response to the selection of deploy input 560, blueprint service 110 and/or engine service 120 may translate the blueprint into ETL instructions, assign a URL to the ETL instructions, and make the URL accessible. In addition, the URL may be displayed to the user (e.g., within screen 500, on a new screen, etc.) so that the user may utilize the URL (e.g., in an integration process). Once deployed, access of the URL will result in the execution of the ETL instructions by engine service 120 and will return the results of the data operation represented by the ETL instructions.

Using the illustrated example, the blueprint may be translated into ETL instructions that generate the following JSON object, and then POST the JSON object to a data API 252 of an engine 250 (e.g., using a required security protocol):

```
{
   "tableserv_name": "Name_A",
   "tableserv_desc": "Data query that joins Table_A, Table_G, Table_C",
   "joins" [
      {
         "from_table": "Table_A",
         "from_field": "Field_2",
         "to_table":   "Table_G",
         "to_field":   "Field_5"
      },
      {
         "from_table": "Table_G",
         "from_field": "Field_2",
         "to_table":   "Table_C",
         "to_field":   "Field_2"
      }
   ],
   "fields": [
      "*"
   ]
}
```

Notably, the JSON object is written in generic code. Engine service 120 will generate the ETL instructions to generate each JSON object in the same generic code. The JSON object defines each connection by the table name and field name, corresponding to one end of the connection, and the table name and field name, corresponding to the other end of the connection. It should be understood that other formats may be used to define operations other than joins. In addition, the JSON object may define the fields to be returned, which in this case is all fields in the joined tables, as represented by the asterisk "*".

Data extractor 254 of each domain-specific engine 250 will translate the generic code in the JSON or other data object into code that is specific to the particular software package being supported by engine 250. For example, data extractor 254 may translate the JSON object above into an SQL query (e.g., a SAP SQL query in the event that third-party platform 200 is a SAP platform), such as:
SELECT * FROM Table_A
   INNER JOIN Table_G ON Table_A~Field_2=Table_G~Field_5
   INNER JOIN Table_C ON Table_G~Field_2=Table_C~Field_2
   INTO TABLE @data (lt_result).
This SQL query can be run against database 220 of a third-party platform 200 to generate a temporary table which can then be returned to engine service 120 as the results of the data operation.

Advantageously, graphical user interface 115 enables a user to construct a blueprint of a data operation using a drag-and-drop interface, without having to know or write any code and with little to no domain knowledge. This blueprint is then translated on the backend into a set of ETL instructions that work with a domain-specific engine 250 to execute the data operation. The user does not need to know anything about how this backend works. By abstracting the details between domain-specific data objects in an easy-to-use drag-and-drop interface, non-technical users can perform ETL operations and other data operations without deep domain knowledge.

In addition, after deploying the blueprint, the user is simply provided with a single URL that can be used to access engine service 120, as a proxy service, at any time, to obtain a result of the data operation. The user can integrate this URL into an integration process of integration system 20 or another process, manually access the URL to obtain the results of the data operation, and/or the like. Any system can ingest the URL to obtain results of the data operation through the proxy service as needed. Again, the user does not have to understand how the proxy service works. All the user needs to do is access or provide access to the URL to perform a data operation.

6. Example Processing Device

Figure 6:
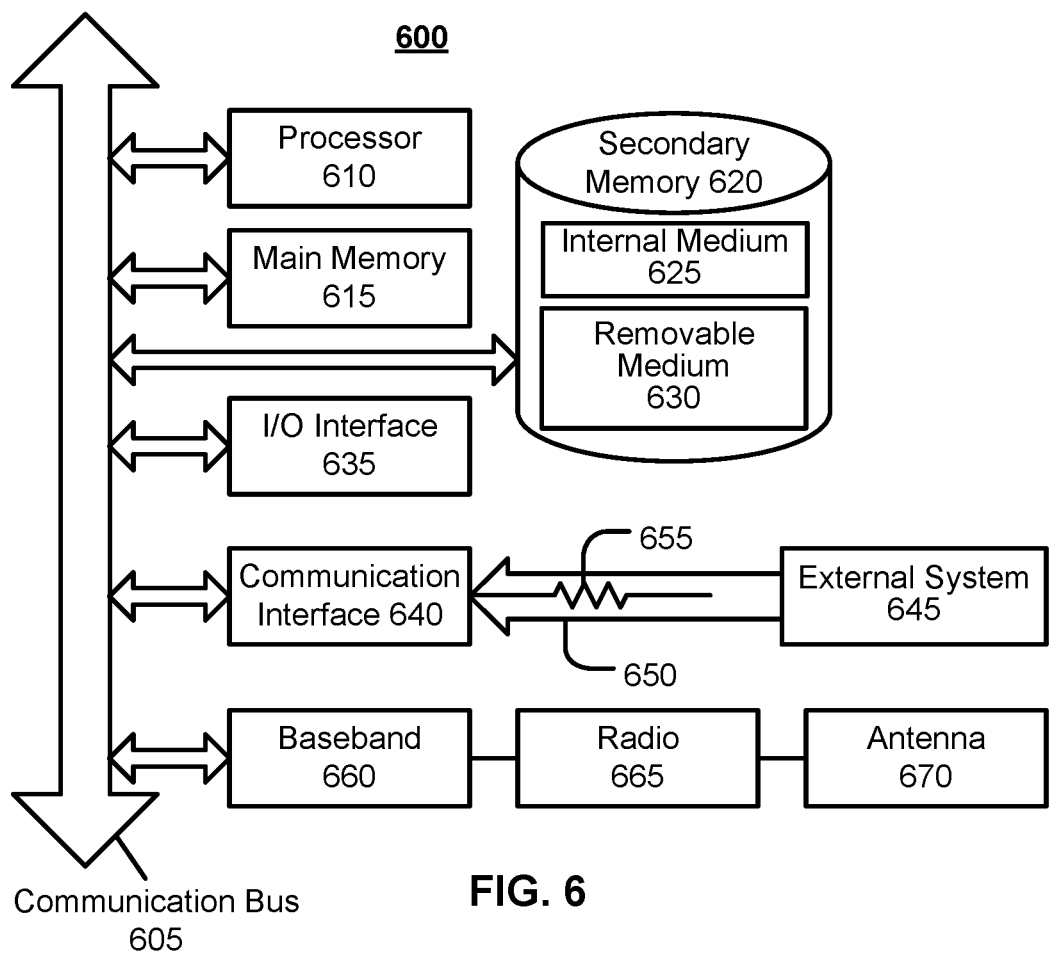
FIG. 6 illustrates an example processing system, by which one or more of the processes described herein may be executed, according to an embodiment.

FIG. 6 illustrates an example processing system 600, by which one or more of the processes described herein may be executed, according to an embodiment. For example, system 600 may be used as or in conjunction with process 400, and may represent components of user system 10, integration system 20, data navigator 100, and/or third-party platform 200. System 600 may be used to execute blueprint service 110, engine service 120, engine 250, and/or cache service 300, render graphical user interface 115, execute an integration process that accesses model API 135, manage model database 130, manage database 220, and/or the like. System 600 can be any processor-enabled device (e.g., server, personal computer, etc.) that is capable of wired or wireless data communication. Other processing systems and/or architectures may also be used, as will be clear to those skilled in the art.

System 600 may comprise one or more processors 610. Processor(s) 610 may comprise a central processing unit (CPU). Additional processors may be provided, such as a graphics processing unit (GPU), an auxiliary processor to manage input/output, an auxiliary processor to perform floating-point mathematical operations, a special-purpose microprocessor having an architecture suitable for fast execution of signal-processing algorithms (e.g., digital-signal processor), a subordinate processor (e.g., back-end processor), an additional microprocessor or controller for dual or multiple processor systems, and/or a coprocessor. Such auxiliary processors may be discrete processors or may be integrated with a main processor 610. Examples of processors which may be used in system 600 include, without limitation, any of the processors (e.g., Pentium™, Core i7™, Core i9™, Xeon™, etc.) available from Intel Corporation of Santa Clara, California, any of the processors available from Advanced Micro Devices, Incorporated (AMD) of Santa Clara, California, any of the processors (e.g., A series, M series, etc.) available from Apple Inc. of Cupertino, any of the processors (e.g., Exynos™) available from Samsung Electronics Co., Ltd., of Seoul, South Korea, any of the processors available from NXP Semiconductors N.V. of Eindhoven, Netherlands, and/or the like.

Processor(s) 610 may be connected to a communication bus 605. Communication bus 605 may include a data channel for facilitating information transfer between storage and other peripheral components of system 600. Furthermore, communication bus 605 may provide a set of signals used for communication with processor 610, including a data bus, address bus, and/or control bus (not shown). Communication bus 605 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-100, and/or the like.

System 600 may comprise main memory 615. Main memory 615 provides storage of instructions and data for programs executing on processor 610, such as any of the services or other software discussed herein. It should be understood that programs stored in the memory and executed by processor 610 may be written and/or compiled according to any suitable language, including without limitation C/C++, Java, JavaScript, Perl, Python, Visual Basic, .NET, and the like. Main memory 615 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

System 600 may comprise secondary memory 620. Secondary memory 620 is a non-transitory computer-readable medium having computer-executable code and/or other data (e.g., any of the software disclosed herein) stored thereon. In this description, the term "computer-readable medium" is used to refer to any non-transitory computer-readable storage media used to provide computer-executable code and/or other data to or within system 600. The computer software stored on secondary memory 620 is read into main memory 615 for execution by processor 610. Secondary memory 620 may include, for example, semiconductor-based memory, such as programmable read-only memory (PROM), erasable programmable read-only memory (EPROM), electrically erasable read-only memory (EEPROM), and flash memory (block-oriented memory similar to EEPROM).

Secondary memory 620 may include an internal medium 625 and/or a removable medium 630. Internal medium 625 and removable medium 630 are read from and/or written to in any well-known manner. Internal medium 625 may comprise one or more hard disk drives, solid state drives, and/or the like. Removable storage medium 630 may be, for example, a magnetic tape drive, a compact disc (CD) drive, a digital versatile disc (DVD) drive, other optical drive, a flash memory drive, and/or the like.

System 600 may comprise an input/output (I/O) interface 635. I/O interface 635 provides an interface between one or more components of system 600 and one or more input and/or output devices. Example input devices include, without limitation, sensors, keyboards, touch screens or other touch-sensitive devices, cameras, biometric sensing devices, computer mice, trackballs, pen-based pointing devices, and/or the like. Examples of output devices include, without limitation, other processing systems, cathode ray tubes (CRTs), plasma displays, light-emitting diode (LED) displays, liquid crystal displays (LCDs), printers, vacuum fluorescent displays (VFDs), surface-conduction electron-emitter displays (SEDs), field emission displays (FEDs), and/or the like. In some cases, an input and output device may be combined, such as in the case of a touch-panel display (e.g., in a smartphone, tablet computer, or other mobile device).

System 600 may comprise a communication interface 640. Communication interface 640 allows software to be transferred between system 600 and external devices (e.g. printers), networks, or other information sources. For example, software may be transferred to system 600 from a network device via communication interface 640. Examples of communication interface 640 include a built-in network adapter, network interface card (NIC), Personal Computer Memory Card International Association (PCMCIA) network card, card bus network adapter, wireless network adapter, Universal Serial Bus (USB) network adapter, modem, a wireless data card, a communications port, an infrared interface, an IEEE 1394 fire-wire, and any other device capable of interfacing system 600 with a network or another computing device. Communication interface 640 preferably implements industry-promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software transferred via communication interface 640 is generally in the form of electrical communication signals 655. These signals 655 may be provided to communication interface 640 via a communication channel 650 between communication interface 640 and an external system 645. In an embodiment, communication channel 650 may be a wired or wireless network, or any variety of other communication links. Communication channel 650 carries signals 655 and can be implemented using a variety of wired or wireless communication means including wire or cable, fiber optics, conventional phone line, cellular phone link, wireless data communication link, radio frequency ("RF") link, or infrared link, just to name a few.

Computer-executable code is stored in main memory 615 and/or secondary memory 620. Computer-executable code can also be received from an external system 645 via communication interface 640 and stored in main memory 615 and/or secondary memory 620. Such computer-executable code, when executed, enables system 600 to perform the various functions of the disclosed embodiments as described elsewhere herein.

In an embodiment that is implemented using software, the software may be stored on a computer-readable medium and initially loaded into system 600 by way of removable medium 630, I/O interface 635, or communication interface 640. In such an embodiment, the software may be loaded into system 600 in the form of electrical communication signals 655. The software, when executed by processor 610, preferably causes processor 610 to perform one or more of the processes and functions described elsewhere herein.

System 600 may comprise wireless communication components that facilitate wireless communication over a voice network and/or a data network (e.g., in the case of user system 10). The wireless communication components comprise an antenna system 670, a radio system 665, and a baseband system 660. In system 600, radio frequency (RF) signals are transmitted and received over the air by antenna system 670 under the management of radio system 665.

In an embodiment, antenna system 670 may comprise one or more antennae and one or more multiplexors (not shown) that perform a switching function to provide antenna system 670 with transmit and receive signal paths. In the receive path, received RF signals can be coupled from a multiplexor to a low noise amplifier (not shown) that amplifies the received RF signal and sends the amplified signal to radio system 665.

In an alternative embodiment, radio system 665 may comprise one or more radios that are configured to communicate over various frequencies. In an embodiment, radio system 665 may combine a demodulator (not shown) and modulator (not shown) in one integrated circuit (IC). The demodulator and modulator can also be separate components. In the incoming path, the demodulator strips away the RF carrier signal leaving a baseband receive audio signal, which is sent from radio system 665 to baseband system 660.

Baseband system 660 is communicatively coupled with processor(s) 610, which have access to memory 615 and 620. Thus, software can be received from baseband processor 660 and stored in main memory 610 or in secondary memory 620, or executed upon receipt. Such software, when executed, can enable system 600 to perform the various functions of the disclosed embodiments.

The above description of the disclosed embodiments is provided to enable any person skilled in the art to make or use the invention. Various modifications to these embodiments will be readily apparent to those skilled in the art, and the general principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

As used herein, the terms "comprising," "comprise," and "comprises" are open-ended. For instance, "A comprises B" means that A may include either: (i) only B; or (ii) B in combination with one or a plurality, and potentially any number, of other components. In contrast, the terms "consisting of," "consist of," and "consists of" are closed-ended. For instance, "A consists of B" means that A only includes B with no other component in the same context.

Combinations, described herein, such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, and any such combination may contain one or more members of its constituents A, B, and/or C. For example, a combination of A and B may comprise one A and multiple B's, multiple A's and one B, or multiple A's and multiple B's.

What is claimed is:

1. A method comprising using at least one hardware processor to:
    receive a blueprint of a data operation, wherein the blueprint comprises a plurality of data objects and one or more connections between the plurality of data objects, wherein receiving the blueprint comprises
        generating a graphical user interface comprising a virtual canvas,
        receiving a user placement of a visual representation of each of the plurality of data objects on the virtual canvas, wherein the plurality of data objects comprises a first data object and a second data object, wherein the first data object is a first table comprising one or more first fields, and wherein the second data object is a second table comprising one or more second fields, and
        receiving a user placement of at least one visual connection between the visual representation of the first data object and the visual representation of the second data object, wherein the at least one visual connection connects a representation of one of the first fields in the visual representation of the first table to a representation of one of the second fields in the visual representation of the second table;
    translate the blueprint into one or more extract, transform, load (ETL) instructions that implement an application programming interface (API) call to an API of an engine to perform the data operation;
    deploy the ETL instructions on an engine service, wherein deploying the ETL instructions comprises assigning a uniform resource locator (URL) to the API call; and
    execute the engine service to, in response to an access of the URL by an accessor, when results of the data operation are not cached,
        execute the ETL instructions to implement the API call to the engine,
        receive the results of the data operation from the engine, and
        return the results of the data operation to the accessor.

2. The method of claim 1, wherein translating the blueprint into one or more ETL instructions comprises generating a query object that defines a join between the first table and the second table, on the one of the first fields and the one of the second fields, for a database query.

3. The method of claim 1 wherein the graphical user interface further comprises a list that includes a visual representation of each of a plurality of available data objects, wherein receiving the user placement of the visual representation of each of the plurality of data objects on the virtual canvas comprises a user dragging the visual representation of the first data object from the list and dropping the visual representation of the first data object onto the virtual canvas at a first user placement, and the user dragging the visual representation of the second data object from the list and dropping the visual representation of the second data object onto the virtual canvas at a second user placement.

4. The method of claim 3, wherein receiving the user placement of the at least one visual connection comprises successively receiving a selection of a first component of the first data object that is visually represented in the visual representation of the first data object, and a selection of a second component of the second data object that is visually represented in the visual representation of the second data object.

5. The method of claim 4, wherein the first data object is a first table and the first component is a field in the first table, and wherein the second data object is a second table and the second component is a field in the second table.

6. The method of claim 1, further comprising using the at least one hardware processor to execute the engine service to, in response to the access of the URL by the accessor:
    determine whether or not the results of the data operation are cached in a memory cache; and,
    when the results of the data operation are cached, retrieve the results of the data operation from the memory cache, and return the retrieved results of the data operation to the accessor without executing the ETL instructions.

7. The method of claim 6, further comprising using the at least one hardware processor to:
maintain a record for each of one or more data operations to be cached, wherein each record comprises a time-to-live interval; and,
for each of the one or more data operations to be cached,
upon expiration of the time-to-live interval in the record for that data operation, execute the ETL instructions to implement the API call to the engine for that data operation,
receive the results of that data operation from the engine, and
store the received results of that data operation in the memory cache in association with that data operation.

8. The method of claim 7, wherein, for each of the one or more data operations to be cached, the time-to-live interval in the record for that data operation is acquired from the blueprint of that data operation.

9. The method of claim 8, wherein the time-to-live interval is user specified.

10. The method of claim 7, wherein the record for each of the one or more data operations further comprises a token that indicates a most recent time in which that data operation was performed.

11. The method of claim 10, further comprising using the at least one hardware processor to, for each of the one or more data operations to be cached, receive the token from the engine with the results of that data operation.

12. The method of claim 1, wherein the engine is hosted on a third-party platform that is remote from the at least one hardware processor, wherein the API call to the engine is sent over at least one network, and wherein the results of the data operation from the engine are received over the at least one network.

13. The method of claim 1, further comprising using the at least one hardware processor to incorporate the URL into an integration process.

14. The method of claim 1, wherein the ETL instructions are configured to:
generate a data object that defines the data operation; and
send the data object to the engine via the API of the engine.

15. A system comprising:
at least one hardware processor; and
one or more software modules that are configured to, when executed by the at least one hardware processor,
receive a blueprint of a data operation, wherein the blueprint comprises a plurality of data objects and one or more connections between the plurality of data objects, wherein receiving the blueprint comprises
generating a graphical user interface comprising a virtual canvas,
receiving a user placement of a visual representation of each of the plurality of data objects on the virtual canvas, wherein the plurality of data objects comprises a first data object and a second data object, wherein the first data object is a first table comprising one or more first fields, and wherein the second data object is a second table comprising one or more second fields, and
receiving a user placement of at least one visual connection between the visual representation of the first data object and the visual representation of the second data object, wherein the at least one visual connection connects a representation of one of the first fields in the visual representation of the first table to a representation of one of the second fields in the visual representation of the second table,
translate the blueprint into one or more extract, transform, load (ETL) instructions that implement an application programming interface (API) call to an API of an engine to perform the data operation, wherein the ETL instructions are configured to generate a data object that defines the data operation, and send the data object to the engine via the API of the engine,
deploy the ETL instructions on an engine service, wherein deploying the ETL instructions comprises assigning a uniform resource locator (URL) to the API call, and
execute the engine service to, in response to an access of the URL by an accessor, when results of the data operation are not cached,
execute the ETL instructions to implement the API call to the engine,
receive the results of the data operation from the engine, and
return the results of the data operation to the accessor.

16. The system of claim 15, further comprising the engine, wherein the engine comprises:
the API; and
a data extractor that translates the data object into the data operation.

17. A non-transitory computer-readable medium having instructions stored therein, wherein the instructions, when executed by a processor, cause the processor to:
receive a blueprint of a data operation, wherein the blueprint comprises a plurality of data objects and one or more connections between the plurality of data objects, wherein receiving the blueprint comprises
generating a graphical user interface comprising a virtual canvas,
receiving a user placement of a visual representation of each of the plurality of data objects on the virtual canvas, wherein the plurality of data objects comprises a first data object and a second data object, wherein the first data object is a first table comprising one or more first fields, and wherein the second data object is a second table comprising one or more second fields, and
receiving a user placement of at least one visual connection between the visual representation of the first data object and the visual representation of the second data object, wherein the at least one visual connection connects a representation of one of the first fields in the visual representation of the first table to a representation of one of the second fields in the visual representation of the second table;
translate the blueprint into one or more extract, transform, load (ETL) instructions that implement an application programming interface (API) call to an API of an engine to perform the data operation;
deploy the ETL instructions on an engine service, wherein deploying the ETL instructions comprises assigning a uniform resource locator (URL) to the API call; and
execute the engine service to, in response to an access of the URL by an accessor, when results of the data operation are not cached,
execute the ETL instructions to implement the API call to the engine, receive the results of the data operation from the engine, and return the results of the data operation to the accessor.

* * * * *